Nov. 4, 1969  E. H. WARNE  3,475,909
PUMPING APPARATUS FOR SUPPLYING FUEL TO AN ENGINE
Filed Oct. 10, 1967
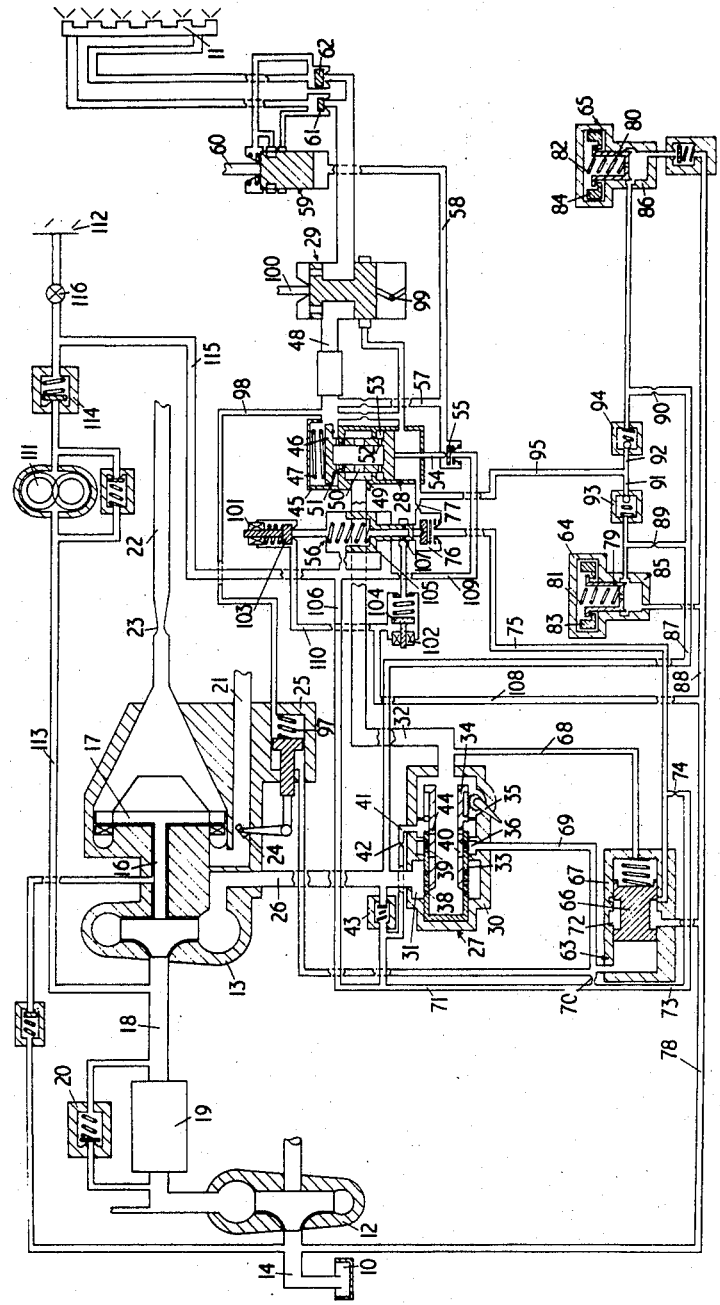
Inventor
Eugene Harold Warne
By Dlaresek Dewing & Seebold
Attorneys

United States Patent Office 3,475,909
Patented Nov. 4, 1969

3,475,909
PUMPING APPARATUS FOR SUPPLYING FUEL TO AN ENGINE
Eugene Harold Warne, Solihull, England, assignor to Joseph Lucas (Industries) Limited, Birmingham, England
Filed Oct. 10, 1967, Ser. No. 674,231
Int. Cl. F02c 9/08
U.S. Cl. 60—39.28                                    2 Claims

ABSTRACT OF THE DISCLOSURE

Pumping apparatus for an engine fuel system comprises an engine driven pump, and an air turbine pump, the latter having an air volume controlling throttle controlled by a servo, this controlling the contribution of the second pump to the pressure output of the apparatus.

---

This invention relates to pumping apparatus for engine fuel systems, particularly though not exclusively for gas turbine engines, the output of the apparatus being variable in accordance with changes in one or more parameters.

The object of this invention is to provide pumping apparatus of the kind referred to in a convenient form.

Pumping apparatus in accordance with the present invention, comprises a pair of pumps arranged for connection in series with one another in an engine fuel system, the first, or upstream pump being provided with means whereby it can be driven by the engine to which the apparatus is intended to supply fuel, and the second or downstream pump being a non-positive displacement type pump and being provided with means whereby it can be driven by an air fed turbine and controls means for determining the volume of air fed to said turbine and therefore the contribution to the delivery pressure due to the second pump.

The invention will now be described with reference to the accompanying drawing which illustrates diagrammatically a fuel system for a gas turbine engine incorporating the present invention.

The fuel system illustrated has defined through it a main fuel flow duct between a reservoir indicated at 10 and a sprayer manifold 11 disposed in an engine with which the system is associated. In the main flow line are a pair of pumps in series indicated at 12 and 13 respectively, both being of non-positive displacement type and in this case both are of centrifugal vane type. The inlet passage to the first or upstream pump is indicated at 14 and communicates with the reservoir 10. This pump 12 is driven through shaft 15 by the associated engine. The second or downstream pump 13 is driven through a shaft 16 from an air driven turbine 17 and there is a passage 18 affording communication between the outlet of the pump 12 and the inlet of the pump 13, this passage 18 including a cooler unit 19 and a pressure relief valve 20. There is an outlet passage 26 from the pump 13 and the pressure in this is determined by the delivery pressures of both pumps 12 and 13. The turbine 17 of the second pump 13 obtains its supply of air through an inlet passage 21 from downstream of the compressor or all of the compressors in the associated engine. The air is discharged after flowing through the turbine 17, from an outlet passage 22 incorporating a venturi 23. In the inlet passage 21 to the turbine 17 is a throttle 24, the setting of which is controlled by a spring-loaded piston and cylinder type servo device 25.

In use, the supply of air is regulated by the throttle 24 and the volume of air which flows through the turbine 17 controls the rise in pressure in the outlet passage 26 which is contributed by the pump 13, since this pump is of the non-positive displacement type, in the event of the air supply to the turbine 21 is substantially cut off, flow of fuel from the pump 12 will still take place through the pump 13 and into the outlet passage 26 leading to the engine sprayer manifold 11. Thus, the capacity of the pumping apparatus, which comprises the pair of pumps 12 and 13, is varied by the control of air supply to the air driven turbine 17 of the pump 13.

The remainder of the fuel system illustrated is described and claimed in the complete specification or our co-pending U.S. patent application No. 674,232.

Between the outlet passage 26 and the burner manifold 11 there is a manually operable throttle 27 and a servo operated throttle 28 in series with it. This is also a rapid shut off cock 29.

The manually operable throttle 27 comprises a cylindrical body 30 having an inlet connected to the passage 26, in its side communicating with an internal annular gallery 31. At one end of the body 30 is an outlet connected to a passage 32 leading to the servo throttle 28. Within the body 30 is mounted a sleeve 33, and within this is slidably mounted an inner sleeve 34 movable axially by means of a manual throttle lever 35. Two further internal annular galleries 36, 37 are provided in the body 30.

The sleeve 33 has two sets of holes 38, 39 in its wall, the set 38 communicating with the gallery 31 and the other set 39 with the gallery 36. The inner sleeve 34 however controls the flow of fuel through the sets of holes 38, 39 and for this purpose has openings 40 affording communication between the interior of the inner sleeve 34 and the holes 39. The edge of the inner sleeve provides a metering edge for the flow through the holes 38.

The gallery 37 communicates with an idling by-pass passage 41 including a variable needle valve 42. This passage 41 communicates with the passage 26 at the upstream side of the throttle 27 through a pressurising valve 43. The arrangement is such that only when the inner sleeve 34 closes the holes 38 entirely, will the gallery 37 communicate with the interior of the inner sleeve 33, through further holes 44 therein, to permit fuel to flow for purposes of running the engine at idling speed.

The servo throttle 28 has a body 45 containing a hollow piston 46 against which a spring 47 acts. The body 45 has a main inlet from the passage 32 and a main outlet to a passage 48 leading through the rapid shut-off cock 29, to the engine burner manifold 11. The body 45 of the servo throttle has a gallery 49, communicating with the inlet and the piston 46 has openings 50 communicating therewith at all its axial positions in the body 45.

Further sets of openings 51 in the piston 46 meter flow between the inlet gallery 49, through the interior of the piston 46, to the outlet and the passage 48. Still further openings 52 in the piston 46 afford communication between the piston interior and a portion 53 of the body cavity divided from the remainder by a flange to provide means whereby fuel pressure can act on the piston in the same direction as the spring 47.

The end of the piston 46 remote from the spring 47 carries a valve actuating rod 54 acting against a spring-loaded valve closure member 55. This member 55 controls flow of fuel to an electrical solenoid controlled valve 56 (to be further described) from the passage 48 through a restricted passage 57. The existance of fuel under pressure in the passage 57 and in a communicating passage 58 serves to hold closed a dump valve 59 which, when opened allows fuel from the burner manifold 11 to escape through a passage 60. The manifold is illustrated as having two independently fed portions, controlled by pressurising valves 61, 62 respectively.

The opening of the servo throttle 28 is controlled by the balance of pressures acting on the piston 46. The pressure existing in the end of the body 45 remote from the spring 47 is controlled by a pressure drop sensing unit 63 and by high and low pressure governors 64, 65.

The pressure drop unit 63 is in the form of a spring loaded spool 66 mounted in a body 67. The unit is intended to maintain a constant pressure drop across the throttle afforded by the holes 39 and corresponding metering edge of the inner sleeve 34 of the manual throttle 27. The pressure downstream of this throttle reaches the pressure drop unit 63 through a passage 68 and that at its upstream side reaches it through a passage 69. The holes 39 form one of a pair of restrictors in a secondary fuel flow passage, the second restrictor being provided at 70 in a passage 71 communicating with the passage 26 from the pumping apparatus through the valve 43.

The pressure drop unit has an intermediate gallery 72 in its spool 66 to which fuel is fed through a passage 73 communicating with the passage 71 from the pumping apparatus outlet 26. The passage 73 includes a fixed restrictor 74 and a variable restrictor of a potentiometer arrangement is provided by the edge of the spool 66 of the unit 63 controlling flow to the gallery 72. The pressure between these two restrictors is exerted upon the servo throttle piston 46 at its end remote from the spring 47, through a passage 75. This passage 75, however also includes a valve 76 and a fixed restrictor 77, the former being controlled by the solenoid operated valve 56. The pressure in the gallery 72 of the pressure drop unit 63 is that at the pumping apparatus inlet, with which it communicates through a passage 78.

The high and low pressure governors 64 and 65 are identical and comprise speed responsive valve members 79, 80 controlled by springs 81, 82 and weights 83, 84 respectively. The members 79, 80 are axially movable within their bodies 85, 86 to control fuel flow from a passage 87 to a further passage 88. The passage 87 communicates with the passage 26 upstream of the manual throttle 27, and has respective restrictors 89, 90 associated with the governors 64 and 65 respectively. The passage 88 communicates with the passage 78 to the inlet of the system. Between the restrictors 89, 90 and the governors 64, 65 respectively are connected further passages 91, 92 including respective non-return valves 93, 94. These passages communicate with the servo throttle 28 through a passage 95, at a position in the passage 75, between the fixed restrictor 77 and the servo throttle itself. The governors 64, 65 are driven by the two shafts of the engine respectively.

The servo device 25 of the air driven turbine 17 is controlled by the pressure at the upstream side of the secondary throttle formed by the holes 39 in the manual throttle inner sleeve 34, through a passage 96, at one side. The other side, having a spring 97, also has pressure at the downstream side of the servo throttle 28 exerted upon it through a passage 98.

The system thus far described, during normal running conditions, provides a supply of fuel to the engine burner manifold 11 which is dependent upon the opening of the throttles 27, 28, the former being manually controlled and the latter being controlled by the pressure drop across the throttle 27 (the main and secondary holes 38 and 39 in the sleeve 33 are uncovered in proportion to one another), and also by engine speed, the governor 64, 65 providing signals of this to the servo throttle 28. Additionally, the pressure drop across both throttles 27, 28 determines the amount of air which can reach the air driven turbine 17 and thus the pressure of fuel delivered by the pumping apparatus.

A quick shut-down valve 29 is provided downstream of the servo throttle 28. When this is opened mechanically through a linkage 99, fuel from the passage 48 can escape through a passage 100.

Shut-down normally is achieved by actuating the solenoid operated valve 56, in order to shut the valve 76 controlled thereby. This allows the pressure in the servo throttle 28 to fall so that this throttle is closed. This has the effect of stopping flow in the passage 48 to the engine, and with closure of the valve 55, the pressure in the dump valve 59 will fall to allow fuel in the burner manifold 11 to escape through the passage 60.

Actuation of the valve 56 is controlled by two electrical solenoids 101, 102. The solenoid 101 controls a valve closure member 103 and the solenoid 102 controls a similar member 104. The valve 56 itself has a spring-loaded member 105 to one side of which fuel at the pressure of the passage 26 is admitted through a passage 106. This fuel can escape through a restricted opening 107 in the member 105, through the solenoid valve 104 to the inlet of the pumping apparatus, through a passage 108, this being possible when the solenoid valve 104 is open, as it is when the engine is running. The opening of the valve 55 admits fuel to the side of the member 105 of the valve 56, through a passage 109, at the pressure existing at the downstream side of the servo throttle 28, as modified by flow through the restricted passage 57.

To shut down the flow of fuel to the engine, the solenoid 102 is operated so that the valve 76 will close as a result of rise in pressure in the end of the valve 56 having the spring. Closure of the valve 76 cuts off pressure from the passage 75 from the pressure drop unit. This in turn will cause the servo-throttle 28 to close.

Starting of the engine can be achieved by actuating the solenoid valve 103 which, through a passage 110 connects the side of the valve 56 with the pumping apparatus inlet through the passage 108. The solenoid valve 104 must however be opened. The member 105 of the valve 56 will now move, as pressure is built up at the opposite end of the member 105. The valve 103 can now be closed again by de-energisation of the solenoid 101 and the member 105 will maintain a balance position.

However since the pumping apparatus comprises centrifugal pumps 12, 13 slow running of the engine during starting will fail to produce sufficient pressures to open the servo throttle 28, nor will the valve 56 be operated allowing the closure of the solenoid valve 103 to take place.

Accordingly there is provided an electrically driven pump 111 serving igniter burners 112 in the engine. This system is supplied through a passage 113 from the passage 18 between the pumps 12, 13 and also includes a pressurising valve 114. At a position downstream of the valve 114 is a passage 115 which permits pressure at the downstream side of the pump 111 to be exerted upon the valve 56. This pressure also reaches the servo throttle 28 through the passages 115, 106, 71, 73, 75 and past the now open valve 76.

The pump 111 will be stopped and the valve 114 will operate as a non-return valve when the main system delivers sufficient pressure to maintain the various pressure balances required in the system. A shut-off cock 116 will prevent fuel being delivered from the main system to the igniter burners 112.

Only one governor is required if the engine is of the kind having a single shaft.

Having thus described my invention what I claim as new and desire to secure by Letters Patent is:

1. Pumping apparatus for supplying fuel to an engine and comprising a first pump, means whereby said first pump can be driven by the engine, a second pump arranged in series with the first pump, the second pump being centrifugal type, an air fed turbine drivingly connected to the second pump, passage means for supply of air to said air driven turbine, a throttle in said passage means to control the supply of air to the turbine, fuel passage means through which fuel from the pumps reaches the engine, a throttle in said fuel passage means, and a control means whereby the pressure drop across said throttle is used to control the throttle in the passage means to the air driven turbine.

2. Pumping apparatus as claimed in claim 1 in which the throttle in the passage means to the air driven turbine is controlled by a servo device to which pressures obtained from said control means are applied.

References Cited

UNITED STATES PATENTS

| | | | |
|---|---|---|---|
| 2,742,755 | 4/1956 | Davies et al. | 60—39.28 X |
| 2,964,904 | 12/1960 | Davies | 60—39.28 X |
| 3,230,709 | 1/1966 | Turner | 60—39.28 |

AL LAWRENCE SMITH, Primary Examiner